(12) United States Patent
Matsui et al.

(10) Patent No.: US 7,536,113 B2
(45) Date of Patent: *May 19, 2009

(54) CHIRP MANAGED DIRECTLY MODULATED LASER WITH BANDWIDTH LIMITING OPTICAL SPECTRUM RESHAPER

(75) Inventors: Yasuhiro Matsui, Lawrence, MA (US); Duncan Walker, Walton-on-Thames (GB); Daniel Mahgerefteh, Los Angeles, CA (US); Parviz Tayebati, Weston, MA (US)

(73) Assignee: Finisar Corporation, Sunnyvale, CA (US)

( * ) Notice: Subject to any disclaimer, the term of this patent is extended or adjusted under 35 U.S.C. 154(b) by 570 days.

This patent is subject to a terminal disclaimer.

(21) Appl. No.: 11/037,718

(22) Filed: Jan. 18, 2005

(65) Prior Publication Data

US 2006/0002718 A1 Jan. 5, 2006

Related U.S. Application Data

(63) Continuation of application No. 10/680,607, filed on Oct. 6, 2003, now Pat. No. 7,054,538, and a continuation-in-part of application No. 10/308,522, filed on Dec. 3, 2002, and a continuation-in-part of application No. 10/289,944, filed on Nov. 6, 2002, now Pat. No. 6,963,685.

(60) Provisional application No. 60/536,967, filed on Jan. 16, 2004.

(51) Int. Cl.
*H04B 10/06* (2006.01)

(52) U.S. Cl. .................. 398/201; 398/185; 398/186; 398/187

(58) Field of Classification Search ............... 398/185, 398/186–187, 201
See application file for complete search history.

(56) References Cited

U.S. PATENT DOCUMENTS

| | | | |
|---|---|---|---|
| 3,324,295 | A | 6/1967 | Harris |
| 3,999,105 | A | 12/1976 | Archey et al. |
| 4,038,600 | A | 7/1977 | Thomas et al. |
| 4,561,119 | A | 12/1985 | Epworth |
| 4,805,235 | A | 2/1989 | Henmi |
| 4,841,519 | A | 6/1989 | Nishio |
| 5,293,545 | A | 3/1994 | Huber |

(Continued)

FOREIGN PATENT DOCUMENTS

GB     2107147 A     4/1983

(Continued)

OTHER PUBLICATIONS

Chang-Hee Lee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

(Continued)

*Primary Examiner*—Leslie Pascal
(74) *Attorney, Agent, or Firm*—Workman Nydegger

(57) ABSTRACT

A fiber optic communication system, comprising:
an optical signal source adapted to produce a frequency modulated signal; and
an optical spectrum reshaper adapted to receive the frequency modulated signal and output a substantially amplitude modulated signal;
wherein the optical spectrum reshaper limits the bandwidth of the frequency modulated signal.

8 Claims, 11 Drawing Sheets

Transmission system comprising an FM source with bandwidth limiting optical spectrum reshaper

U.S. PATENT DOCUMENTS

| | | | |
|---|---|---|---|
| 5,325,378 | A | 6/1994 | Zorabedian |
| 5,371,625 | A | 12/1994 | Wedding et al. |
| 5,412,474 | A | 5/1995 | Reasenberg et al. |
| 5,416,629 | A | 5/1995 | Huber |
| 5,465,264 | A | 11/1995 | Buhler et al. |
| 5,477,368 | A | 12/1995 | Eskildsen et al. |
| 5,550,667 | A | 8/1996 | Krimmel et al. |
| 5,592,327 | A | 1/1997 | Gabl et al. |
| 5,737,104 | A | 4/1998 | Lee et al. |
| 5,777,773 | A | 7/1998 | Epworth et al. |
| 5,805,235 | A | 9/1998 | Bedard |
| 5,856,980 | A | 1/1999 | Doyle et al. |
| 5,920,416 | A | 7/1999 | Beylat et al. |
| 5,953,139 | A | 9/1999 | Nemecek et al. |
| 5,953,361 | A | 9/1999 | Borchert et al. |
| 5,974,209 | A | 10/1999 | Cho et al. |
| 6,081,361 | A | 6/2000 | Adams et al. |
| 6,096,496 | A | 8/2000 | Frankel |
| 6,104,851 | A | 8/2000 | Mahgerefteh |
| 6,115,403 | A | 9/2000 | Brenner et al. |
| 6,222,861 | B1 | 4/2001 | Kuo et al. |
| 6,271,959 | B1 | 8/2001 | Kim et al. |
| 6,298,186 | B1 | 10/2001 | He |
| 6,331,991 | B1 | 12/2001 | Mahgerefteh |
| 6,353,623 | B1 | 3/2002 | Munks et al. |
| 6,359,716 | B1 | 3/2002 | Taylor |
| 6,421,151 | B1 | 7/2002 | Berger et al. |
| 6,473,214 | B1 * | 10/2002 | Roberts et al. ............... 398/183 |
| 6,506,342 | B1 | 1/2003 | Frankel |
| 6,563,623 | B1 | 5/2003 | Penninckx et al. |
| 6,577,013 | B1 | 6/2003 | Glenn et al. |
| 6,618,513 | B2 | 9/2003 | Evankow, Jr. |
| 6,650,667 | B2 | 11/2003 | Nasu et al. |
| 6,654,564 | B1 | 11/2003 | Colbourne et al. |
| 6,658,031 | B2 | 12/2003 | Tuganov et al. |
| 6,665,351 | B2 | 12/2003 | Hedberg et al. |
| 6,687,278 | B1 | 2/2004 | Mason et al. |
| 6,748,133 | B2 | 6/2004 | Liu et al. |
| 6,778,307 | B2 | 8/2004 | Clark |
| 6,810,047 | B2 | 10/2004 | Oh et al. |
| 6,834,134 | B2 | 12/2004 | Brennan et al. |
| 6,836,487 | B1 | 12/2004 | Farmer et al. |
| 6,847,758 | B1 | 1/2005 | Watanabe |
| 6,943,951 | B2 | 9/2005 | Kikuchi et al. |
| 6,947,206 | B2 | 9/2005 | Tsadka et al. |
| 6,963,685 | B2 | 11/2005 | Mahgerefteh et al. |
| 7,013,090 | B2 | 3/2006 | Adachi et al. |
| 7,054,538 | B2 | 5/2006 | Mahgerefteh et al. |
| 7,076,170 | B2 * | 7/2006 | Choa ......................... 398/115 |
| 7,123,846 | B2 | 10/2006 | Tateyama et al. |
| 7,164,865 | B2 | 1/2007 | Tatsuno et al. |
| 7,263,291 | B2 | 8/2007 | Mahgerefteh et al. |
| 7,280,721 | B2 * | 10/2007 | McCallion et al. ............ 385/37 |
| 2002/0044738 | A1 | 4/2002 | Jablonski et al. |
| 2002/0063930 | A1 | 5/2002 | Blauvelt |
| 2002/0154372 | A1 | 10/2002 | Chung et al. |
| 2002/0159490 | A1 | 10/2002 | Karwacki |
| 2002/0176659 | A1 | 11/2002 | Lei et al. |
| 2003/0002099 | A1 | 1/2003 | Sayyah et al. |
| 2003/0002120 | A1 | 1/2003 | Choa |
| 2003/0067952 | A1 | 4/2003 | Tsukiji et al. |
| 2003/0099018 | A1 | 5/2003 | Singh et al. |
| 2003/0147114 | A1 | 8/2003 | Kang et al. |
| 2003/0193974 | A1 | 10/2003 | Frankel et al. |
| 2003/0210912 | A1 | 11/2003 | Leuthold et al. |
| 2004/0008933 | A1 | 1/2004 | Mahgerefteh et al. |
| 2004/0008937 | A1 | 1/2004 | Mahgerefteh et al. |
| 2004/0036943 | A1 | 2/2004 | Freund et al. |
| 2004/0076199 | A1 | 4/2004 | Wipiejewski et al. |
| 2004/0081386 | A1 | 4/2004 | Morse et al. |
| 2004/0096221 | A1 | 5/2004 | Mahgerefteh et al. |
| 2004/0218890 | A1 | 11/2004 | Mahgerefteh et al. |
| 2005/0100345 | A1 | 5/2005 | Welch et al. |
| 2005/0111852 | A1 | 5/2005 | Mahgerefteh et al. |
| 2005/0175356 | A1 | 8/2005 | McCallion et al. |
| 2005/0206989 | A1 | 9/2005 | Marsh |
| 2005/0271394 | A1 | 12/2005 | Whiteaway et al. |
| 2005/0286829 | A1 | 12/2005 | Mahgerefteh et al. |
| 2006/0002718 | A1 | 1/2006 | Matsui et al. |
| 2006/0008272 | A1 | 1/2006 | Abeles |
| 2006/0018666 | A1 | 1/2006 | Matsui et al. |
| 2006/0029358 | A1 | 2/2006 | Mahgerefteh et al. |
| 2006/0029396 | A1 | 2/2006 | Mahgerefteh et al. |
| 2006/0029397 | A1 | 2/2006 | Mahgerefteh et al. |
| 2006/0193636 | A1 | 8/2006 | Katagiri et al. |
| 2006/0228120 | A9 | 10/2006 | McCallion et al. |
| 2006/0233556 | A1 | 10/2006 | Mahgerefteh et al. |
| 2006/0274993 | A1 | 12/2006 | Mahgerefteh et al. |

FOREIGN PATENT DOCUMENTS

| | | |
|---|---|---|
| JP | 62-189832 | 8/1987 |
| JP | 11-031859 | 2/1999 |
| JP | 2000-105313 | 4/2000 |
| JP | 2001-291928 | 10/2001 |
| JP | 2001-320328 | 11/2001 |
| JP | 2002-243935 | 8/2002 |
| JP | 2002-267834 | 9/2002 |
| JP | 2002-267998 | 9/2002 |
| WO | 9905804 | 2/1999 |
| WO | 10499 | 1/2001 |
| WO | 0117076 A2 | 3/2001 |
| WO | 0118919 A1 | 3/2001 |
| WO | 3005512 | 1/2003 |

OTHER PUBLICATIONS

Corvini, P.J. et al., Computer Simulation of High-Bit-Rate Optical Fiber Transmission Using Single-Frequency Lasers, Journal of Lightwave Technology, Nov. 1987, 1591-1595, vol. LT-5, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Yu, et al., Optimization of the Frequency Response of the Semiconductor Optical Amplifier Wavelength Converter Using a Fiber Bragg Grating, Journal of Lightwave Technology, Feb. 1999, 308-315, vol. 17, No. 2.

Alexander et al., Passive Equalization of Semiconductor Diode Laser Frequency Modulation, Journal of Lightwave Technology, Jan. 1989, 11-23, vol. 7, No. 1.

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Hyryniewicz, J.V., et al., Higher Order Filter Response in Coupled Microring Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Li, Yuan P., et al., Chapter 8: Silicon Optical Bench Waveguide Technology, Optical Fiber Communciations, 1997, 319-370, vol. 111B, Lucent Technologies, New York.

Little, Brent E., Advanced in Microring Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Prokais, John G., Digital Communcations, 2001, 202-207, Fourth Edition, McGraw Hill, New York.

Rasmussen, C.J., et al., Optimum Amplitude and Frequency-Modulation in an Optical Communication Systems Based on Dispersion Supported Transmission, Electronics Letters, Apr. 27, 1995, 746, vol. 31, No. 9.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Matsui, Yasuhiro et al, Chirp-Managed Directly Modulated Laser (CML), IEEE Photonics Technology Letters, Jan. 15, 2006, pp. 385-387, vol. 18, No. 2, Nakahara, K. et al, 40-Gb/s Direct Modulation With High Extinction Ratio Operation of 1.3-μm InGaA1As Multiquantum Well Ridge Waveguide Distributed Feedback Lasers, IEEE Photonics Technology Letters, Oct. 1, 2007, pp. 1436-1438, vol. 19 No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

* cited by examiner

Transmission system comprising an FM source with bandwidth limiting optical spectrum reshaper Frequency modulated output before and after discriminator.

Optical spectrum of FM source modulated with NRZ at 10 Gb/s before and after a bandwidth limiting discriminator.

Eye diagram of FM source with high ER a short, 20 ps, rise time without a bandwidth limiting optical discriminator after 100 km of (1600 ps/nm) dispersion fiber.

Eye diagram of FM source with high ER and slower, 60 ps, rise time without a bandwidth limiting optical discriminator after 100 km of (1600 ps/nm) dispersion fiber.

Eye diagram of FM source with a bandwidth limiting optical spectrum reshaper after 100 km of fiber having a 1600 ps/nm dispersion Output waveform of directly modulated laser. The input signal is a 10 Gb/s NRZ pattern.

Same slope profile in each case. The difference comes from increasing the width of the centre flat top portion.

Bandwidth limiting discriminators of increasing BW.

Effect of optical spectrum reshaper BW on the optical eye.
Here 11.2 GHz BW produces the eyes with the least distortion.
The bit rate is 10 Gb/s.

CHIRP MANAGED DIRECTLY MODULATED LASER WITH BANDWIDTH LIMITING OPTICAL SPECTRUM RESHAPER

REFERENCE TO PENDING PRIOR PATENT APPLICATIONS

This patent application:

(i) is a continuation-in-part of prior U.S. patent application Ser. No. 10/289,944, filed Nov. 6, 2002 by now U.S. Pat. No. 6,963,685 Daniel Mahgerefteh et al. for POWER SOURCE FOR A DISPERSION COMPENSATION FIBER OPTIC SYSTEM;

(ii) is a continuation-in-part of prior U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR;

(iii) is a continuation-in-part of pending prior U.S. patent application Ser. No. 10/680,607, filed Oct. 6, 2003 now U.S. Pat. No. 7,054,538 by Daniel Mahgerefteh et al. for FLAT DISPERSION FREQUENCY DISCRIMINATOR (FDFD); and (iv) claims benefit of pending prior U.S. Provisional Patent Application Ser. No. 60/536,967, filed Jan. 16, 2004 by Yasuhiro Matsui et al. for CHIRP MANAGED DIRECTLY MODULATED LASER WITH BAND WIDTH LIMITING FREQUENCY DISCRIMINATOR.

The four above-identified patent applications are hereby incorporated herein by reference.

FIELD OF THE INVENTION

This invention relates to signal transmissions in general, and more particularly to the transmission of optical signals.

BACKGROUND OF THE INVENTION

The quality and performance of a digital fiber optic transmitter is determined by the distance over which its signal can propagate without severe distortions. The Bit Error Rate (BER) of the signal is measured at a receiver after propagation through dispersive fiber, and then the optical power required to obtain a certain BER (typically $10^{-12}$), sometimes called the sensitivity, is determined.

The difference in sensitivity between (i) the output of the transmitter and (ii) the sensitivity after propagation, is sometimes called the dispersion penalty. This sensitivity difference is typically characterized in connection with the distance over which a dispersion penalty reaches ~1 dB. A standard 10 Gb/s optical digital transmitter, such as an externally modulated source, can typically transmit up to a distance of ~50 km in standard single mode fiber at 1550 nm before it reaches a dispersion penalty of ~1 dB; this distance is sometimes called the dispersion limit. This limit is determined by the fundamental assumption that the signal is transform limited, i.e., the signal has no time varying phase across its bits and has a bit period of 100 ps, or 1/bit rate.

Another measure of the quality of a transmitter is the absolute sensitivity after fiber propagation.

A system for long-reach lightwave data transmission through optical fibers is disclosed in (i) U.S. patent application Ser. No. 10/289,944, filed Nov. 6, 2002 by Daniel Mahgerefteh et al. for POWER SOURCE FOR A DISPERSION COMPENSATION FIBER OPTIC SYSTEM; (ii) U.S. patent application Ser. No. 10/680,607, filed Nov. 6, 2003 by Daniel Mahgerefteh et al. for FLAT DISPERSION FREQUENCY DISCRIMINATOR (FDFD); and (iii) U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR; which patent applications are hereby incorporated herein by reference. The transmitter associated with this novel system is sometimes referred to as a Chirp Managed Laser (CML™) by Azna LLC of Wilmington, Mass. In this new system, a frequency modulated source is followed by an Optical Spectrum Reshaper (OSR) which converts frequency modulation to a substantially amplitude modulated signal and partially compensates for dispersion in the transmission fiber. The Optical Spectrum Reshaper (OSR), sometimes referred to as a frequency discriminator, can be formed by any appropriate optical element that has a satisfactory wavelength dependent transmission function. The OSR can be adapted to convert frequency modulation to amplitude modulation.

SUMMARY OF THE INVENTION

In one preferred embodiment of the present invention, a band pass Optical Spectrum Reshaper (OSR) is disclosed that can convert a frequency modulated signal into a substantially amplitude modulated signal, while limiting the optical bandwidth (BW) of the modulated signal. The benefit of bandwidth reduction is to reduce the dispersion penalty after propagation through the fiber. In this respect it should also be appreciated that the absolute sensitivity of the system can be reduced (i.e., the quality of the signal improved) by using the band pass limiting optical spectrum reshaper.

In one form of the invention, there is provided a fiber optic communication system, comprising:

an optical signal source adapted to produce a frequency modulated signal; and an optical spectrum reshaper adapted to receive the frequency modulated signal and output a substantially amplitude modulated signal;

wherein the optical spectrum reshaper limits the bandwidth of the frequency modulated signal.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

In accordance with the present invention, there is disclosed a band pass optical spectrum reshaper (OSR) that can convert a frequency modulated signal into a substantially amplitude modulated signal, while limiting the optical bandwidth of the modulated signal. The benefit of bandwidth reduction is to reduce the dispersion penalty after signal propagation through the fiber. It should also be appreciated that the absolute sensitivity of the system can be reduced (i.e., the quality of the signal improved) by using the band pass limiting optical spectrum reshaper (OSR).

Figure 1:
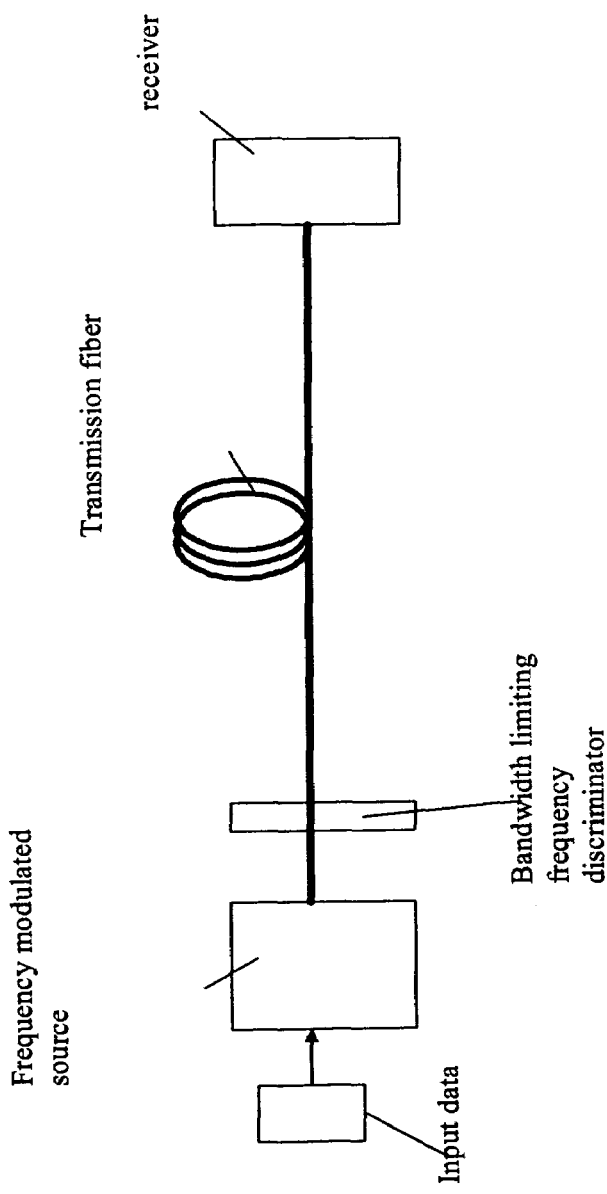
FIG. 1 is schematic diagram illustrating a transmission system comprising an FM source with a bandwidth limiting optical spectrum reshaper.

FIG. 1 shows a system configuration where a frequency modulated source is followed by a bandwidth limiting optical spectrum reshaper (OSR). The frequency modulated signal passes through a transmission fiber and is detected by a standard receiver. The frequency modulated source may be a directly modulated laser diode or other appropriate sources such as the sources disclosed in the aforementioned U.S. patent application Ser. Nos. 10/289,944; 10/308,522; and 10/680,607, e.g., a distributed Bragg reflector laser (DBR).

Figure 2:
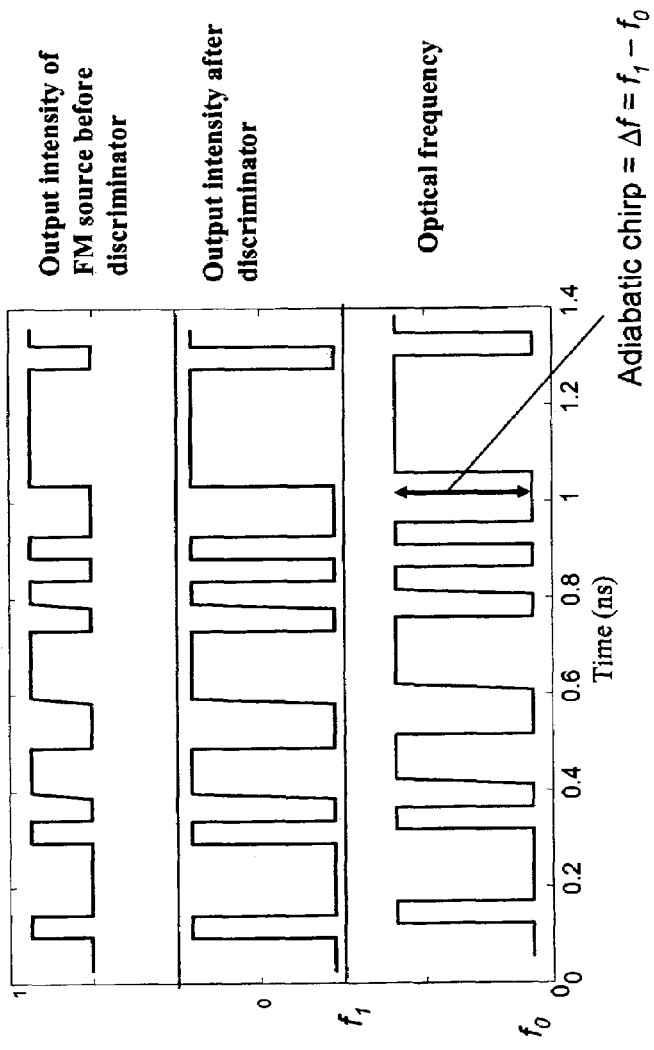
FIG. 2 is a schematic diagram illustrating a frequency modulated output before and after passage through the OSR (i.e., optical discriminator)

FIG. 2 shows the Frequency Modulation (FM) and Amplitude Modulation (AM) of the source. In the example of a directly modulated semiconductor laser, the frequency excursion of the source nearly follows the time varying amplitude modulation. The extinction ratio of the FM source may be approximately 0-7 dB. The optical discriminator converts FM to AM and increases the extinction ratio to >10 dB (or other desired value).

Figure 3:
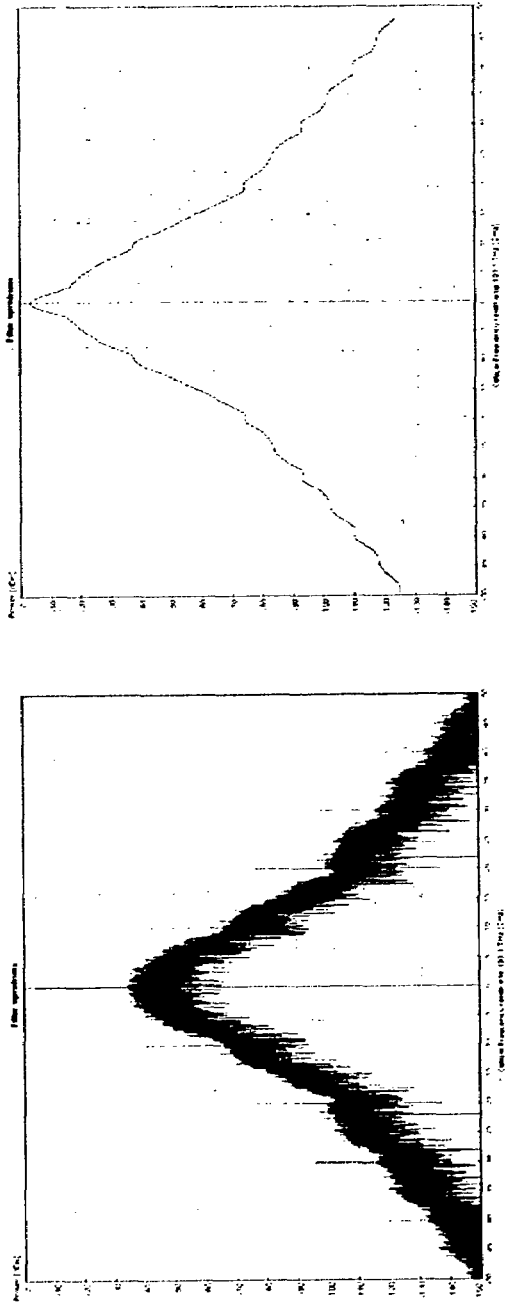
FIG. 3 is a schematic diagram illustrating an optical spectrum of an amplitude modulated signal.

For a Non-Return-To-Zero (NRZ) digital optical signal at a bit rate of 10 Gb/s, the optical spectrum, typically measured at the −20 dB points, is approximately 20 GHz, or twice as large as the bit rate, because optical modulation is double-sided (see FIG. 3). In FIG. 3, the optical carrier, which is a discrete component at the center frequency, is neglected for calculation of Bandwidth (BW). FIG. 3 shows an example of such an amplitude modulated spectrum.

As described in the aforementioned U.S. patent application Ser. Nos. 10/289,944; 10/308,522; and 10/680,607, using an OSR after an FM source reduces the dispersion penalty after fiber propagation. In accordance with the present invention, if the discriminator (i.e., OSR) also limits the bandwidth of the signal to a value smaller than the spectral width of the FM signal, the dispersion penalty after propagation is further decreased. In other words, the bandwidth limiting discriminator modifies the spectral profile to reduce the amplitude of the high frequency components on either side of the carrier relative to the amplitude of the low frequency components closer to the carrier. For example, frequency components greater than +/−10 GHz are substantially attenuated compared to the frequency components within +/−5 GHz of the carrier. In this context high or low refer to the absolute value of the frequency deviation from the carrier frequency, not their numerical values.

The optical spectrum reshaper (OSR) in a preferred embodiment of the present invention is a band pass filter with a bandwidth which is smaller than ~2 times the bit rate of the modulated data. In a preferred embodiment of the invention, the wavelength of the input frequency modulated signal is shifted relative to the peak transmission of the band pass filter. This shift places the frequency modulated signal at the edge of the filter transmission and converts the frequency modulated signal to a substantially amplitude modulated signal. In this configuration the so-called "skirts" of the band pass filter (i.e., the parts of the transmission spectrum that are on either side of the peak transmission) also limit the optical bandwidth by cutting the high frequency components of the input modulated signal; i.e. those frequency components furthest from the carrier frequency.

Figure 4:
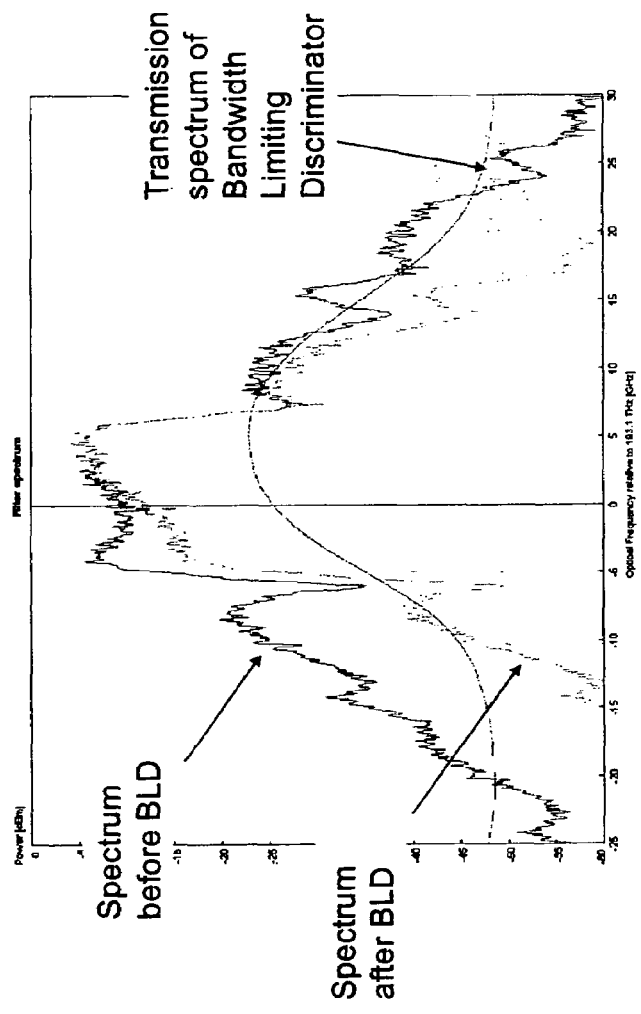
FIG. 4 is a schematic diagram illustrating an optical spectrum of an FM source modulated with a Non-Return-To-Zero (NRZ) signal at 10 Gb/s, with the spectrum being shown both before, and after passing through, a bandwidth limiting discriminator (i.e., OSR)

FIG. 4 shows an example of an FM spectrum for a NRZ 10 Gb/s signal, and the relative position of the filter to the input spectrum. The FM to AM conversion increases the extinction ratio of the output because of the shift. For a directly modulated laser, such as in this example, the input frequency modulated spectrum has two peaks corresponding to the frequency of the 1 bits and the frequency of the 0 bits. In this configuration, the 1 bits have a blue shift relative to the 0 bits. Hence, the shift of the input spectrum relative to the edge of the filter is such that the 1 bits have smaller loss through the filter relative to the red shifted 0 bits.

The bandwidth of the modulated signal, which is typically measured at the −20 dB below the center peak of its optical spectrum, is determined both by the bit rate of modulations and by the rise times and fall times of the resulting signal It should be noted that most of the information carrying part of a 10 Gb/s NRZ electrical signal is only ~5 GHz wide. However, short rise times and fall times of square shaped pulses further increase the bandwidth. Shorter rise times and fall times cause the optical eye diagram to be square-shaped, with a large opening before fiber propagation. However, short rise times and fall times are not ideal for propagation through dispersive fiber. The higher optical bandwidth resulting from the short rise times and fall times causes the optical eye to distort in a shorter span of fiber due to fiber dispersion. The delay caused by dispersion increases linearly with the optical bandwidth. Shorter rise times and fall times cause more dispersion penalty.

For a typical transmission system, one common metric is the sensitivity at the receiver, which is defined as the average optical power required at the receiver to obtain a certain BER (typically ~$10^{-12}$).

Another common metric for a typical transmission system is dispersion penalty, defined as the difference between the sensitivity before and after fiber transmission.

Figure 5:
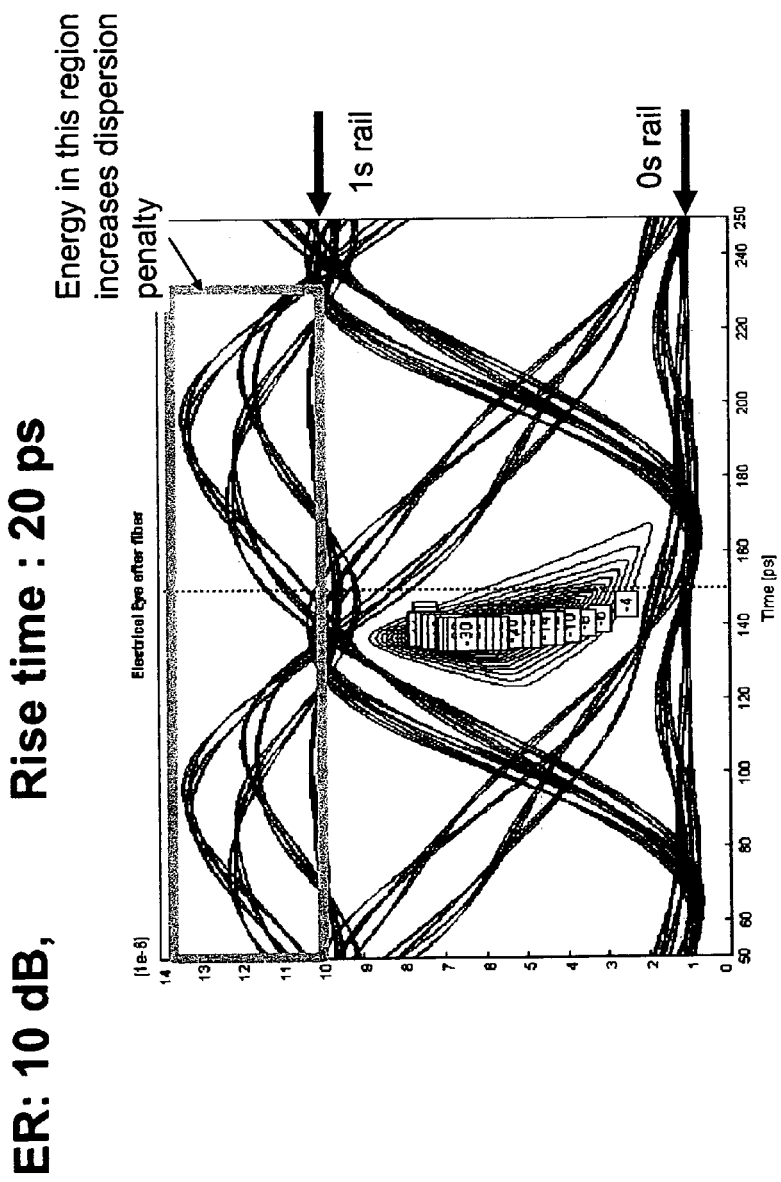
FIG. 5 shows an eye diagram of an FM source with high Extinction Ratio (ER) and a short (20 ps) rise time without a bandwidth limiting optical spectrum reshaper (OSR) after passage through 100 km of fiber (1600 ps/nm dispersion)

FIG. 5 shows the eye diagram for an FM source after passage through 100 km of standard dispersion fiber, having 1600 ps/nm dispersion, for infinitesimally short rise times and fall times and 6 GHz of adiabatic chirp. The contours in the middle of the eye indicate the lines of constant bit error (BER)

rate in logarithmic units; so −20 indicates a BER ~$10^{-20}$. Although the BER obtained in the optimum threshold point is low, it does not lead to the lowest (i.e., best) sensitivity. This is because the energy above the 1s rail and below the 0s rails is wasted energy which does not carry information. This ringing, which is sometimes referred to as "rabbit ears", is caused by the frequency components of the transmitted eye with frequency higher than the information bandwidth of the signal; i.e. by the outer wings of the spectrum shown in FIG. 4. These frequency components are the high harmonics of the amplitude modulation. The shorter rise times and fall times lead to these higher frequencies. Upon fiber propagation, these high frequencies disperse faster than other components and appear as the "rabbit ears", appearing above the 1s and below the 0s rails. This extra energy increases the sensitivity at the receiver.

The BER is determined by the amplitude of the eye, which is the difference between the 1s rail and 0s rails. Therefore, in order to obtain the lowest BER, the presence of the "rabbit ears" requires the use of a higher average optical power, and this in turn leads to a higher dispersion penalty.

Figure 6:
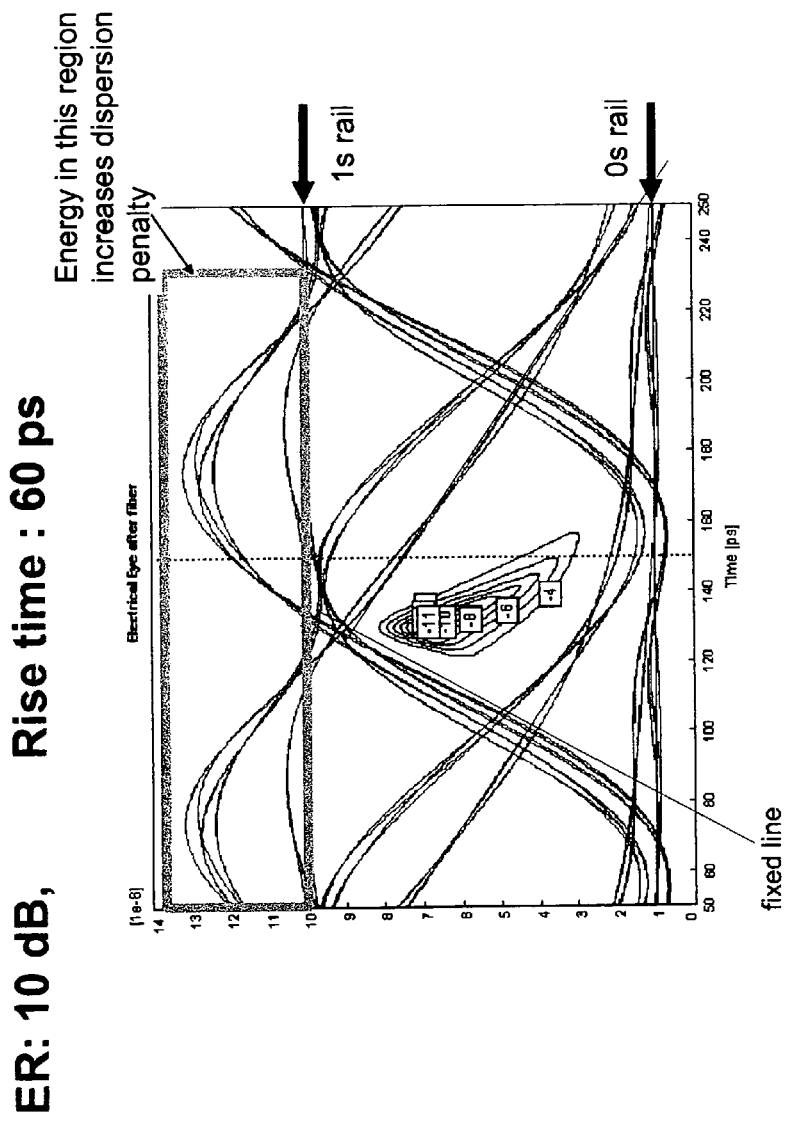
FIG. 6 shows an eye diagram of an FM source with high ER and a slower (60 ps) rise time without a bandwidth limiting optical spectrum reshaper (OSR) after passage through 100 km of fiber (1600 ps/nm dispersion).

FIG. 6 illustrates how reducing the rise times and fall times by using input data pulse shapes that are electrically low pass filtered prior to modulating the laser, for example, reduces the energy in the above 1s rail; however, it does not reduce it significantly. However, a still better sensitivity can be obtained by using a Bandwidth Limiting Discriminator (BLD). Also, in such a configuration, the eye opening is reduced, which means that the dispersion penalty is not optimal.

The "rabbit ears" can be removed by using an optical band pass filter after the frequency modulated source that limits the frequencies higher than the information bandwidth of the signal. In a preferred embodiment of the present invention, the 3 dB bandwidth of the optical spectrum reshaper, BW, is in the range:

½B<BW<2B, where B is the bit rate. As is well recognized in the art, the 3 dB bandwidth of a filter is defined as follows: the transmission of the filter is measured as a function of frequency relative to the peak transmission, in decibel units; the 3 dB bandwidth is the difference between the two frequency values for which the relative transmission is −3 dB from the peak transmission.

Figure 7:
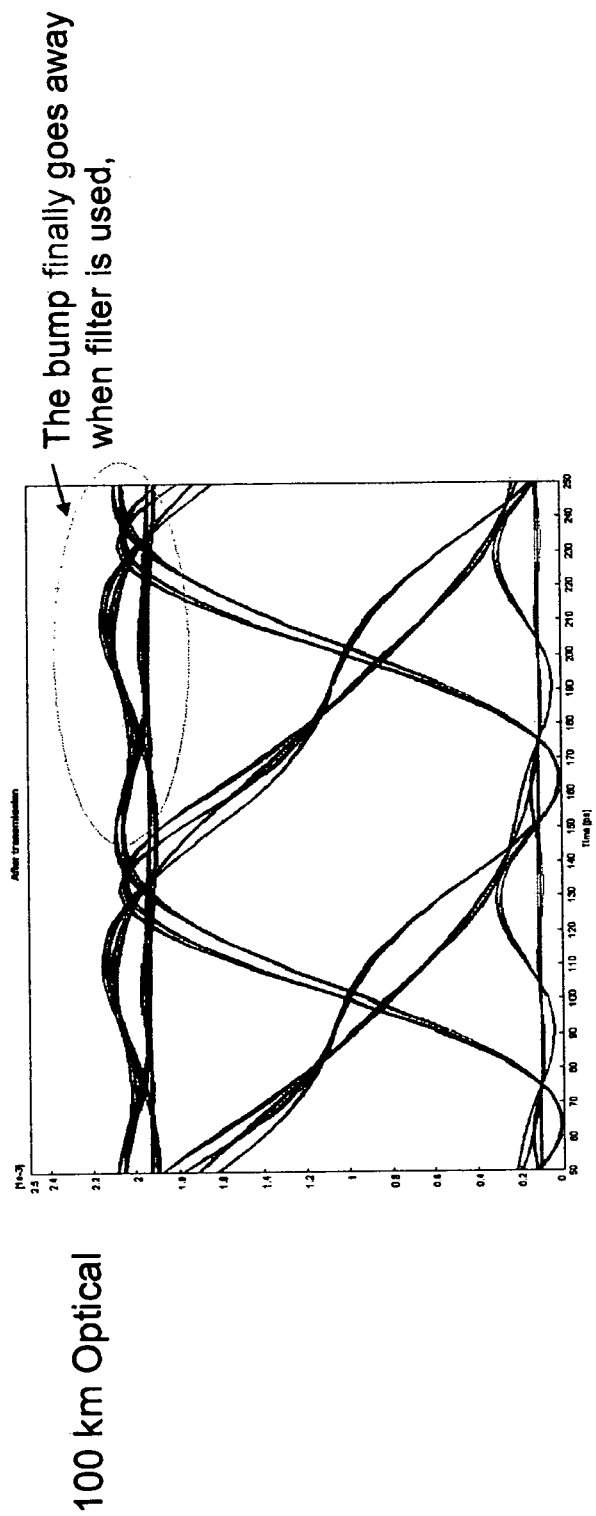
FIG. 7 shows an eye diagram of an FM source with a bandwidth limiting optical spectrum reshaper (OSR) after passage through 100 km of fiber having a 1600 ps/nm dispersion.

FIG. 7 shows an example of the eye diagram obtained by adding a bandwidth limiting optical spectrum reshaper after the FM source. For BW values below the bit rate, the rise times and fall times become longer, and the eye at the output of the transmitter tends to slightly close. However, the benefit of the reduced BW signal becomes clear after propagation through optical fiber; where the dispersion penalty is greatly reduced.

Figure 8:
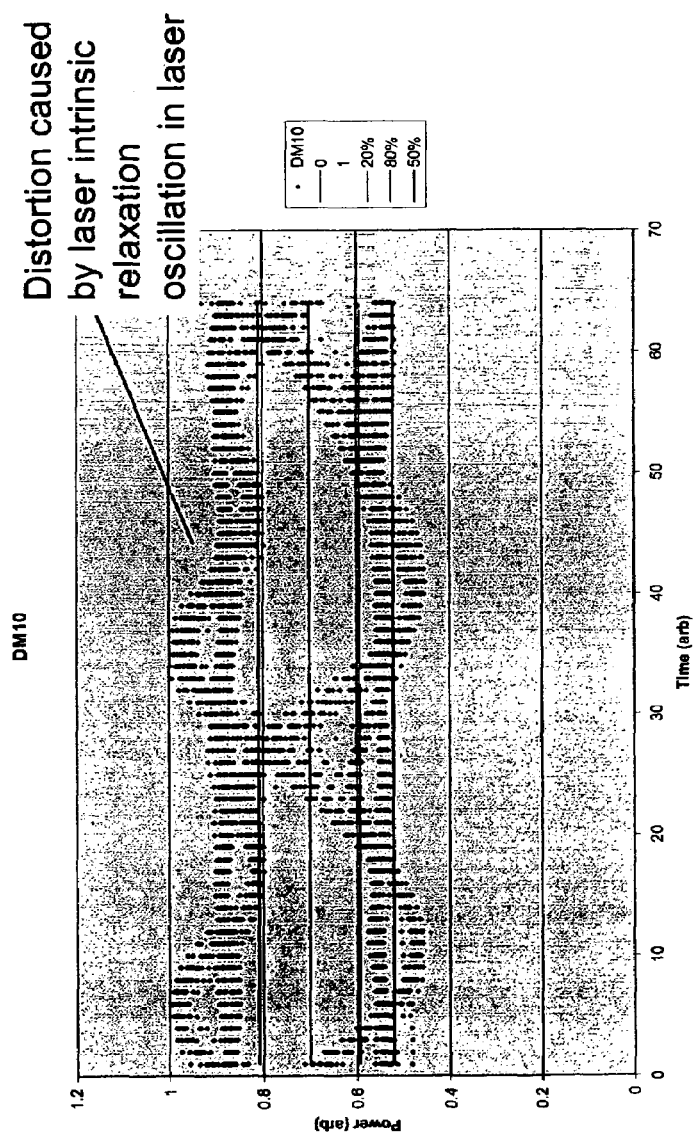
FIG. 8 is a schematic diagram illustrating an output waveform of a directly modulated laser, wherein the input signal is a 10 Gb/s NRZ pattern.

In a configuration where the frequency modulated source is a directly modulated semiconductor laser (DML), the bandwidth limiting reshaper can also remove the intrinsic distortions of the output waveform of the laser. When a directly modulated semiconductor laser is modulated with a digital signal, such as an NRZ format data stream, it may produce a waveform with substantial ringing as shown in FIG. 8. The amplitude of the ringing increases as the laser is biased closer to its threshold current, and the output extinction ratio is increased. Even when the bias is high and the Extinction Ratio (ER) low, however, the detrimental ringing can occur due to the intrinsic relaxation oscillation in the laser.

When a Directly Modulated Laser (DML) is used as the FM source, such as is disclosed in the aforementioned U.S. patent application Ser. Nos. 10/289,944; 10/308,522; and 10/680,607, the distortion remains. In addition, the transient chirp associated with this ringing produces further distortion after propagation though fiber and thus increases dispersion penalty. Transient chirp is the main reason that DML lasers are not generally used for long distance applications. The bandwidth limiting optical spectrum reshaper of the present invention, which "cuts out" the high frequency components associated with the ringing, removes this ringing.

Figure 9:
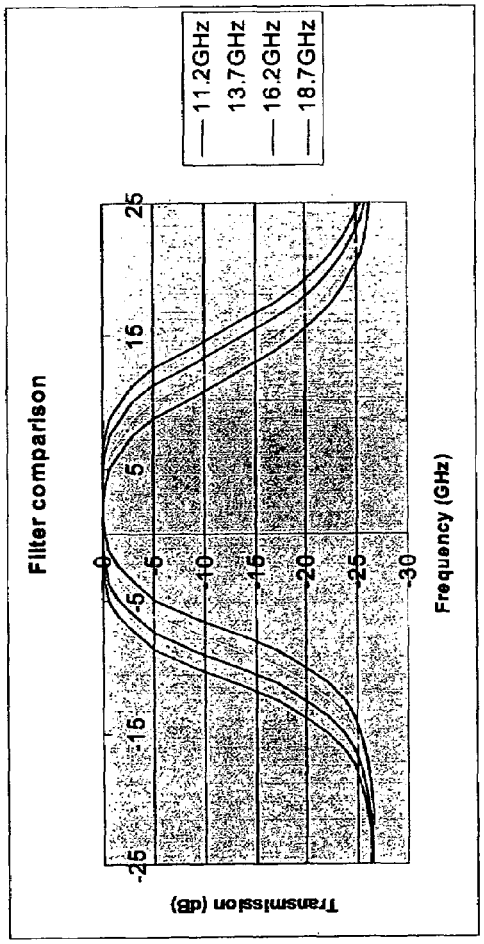
FIG. 9 is a schematic diagram illustrating bandwidth limiting discriminators of increasing bandwidth.

FIG. 9 illustrates the comparison between a number of bandwidth limiting optical spectrum reshapers having different bandwidths. The effect of BW is understood by simulation: the optical signals shown in FIG. 8 are passed through the filters shown in FIG. 9 to generate the eye diagrams shown in FIG. 10.

Figure 10:
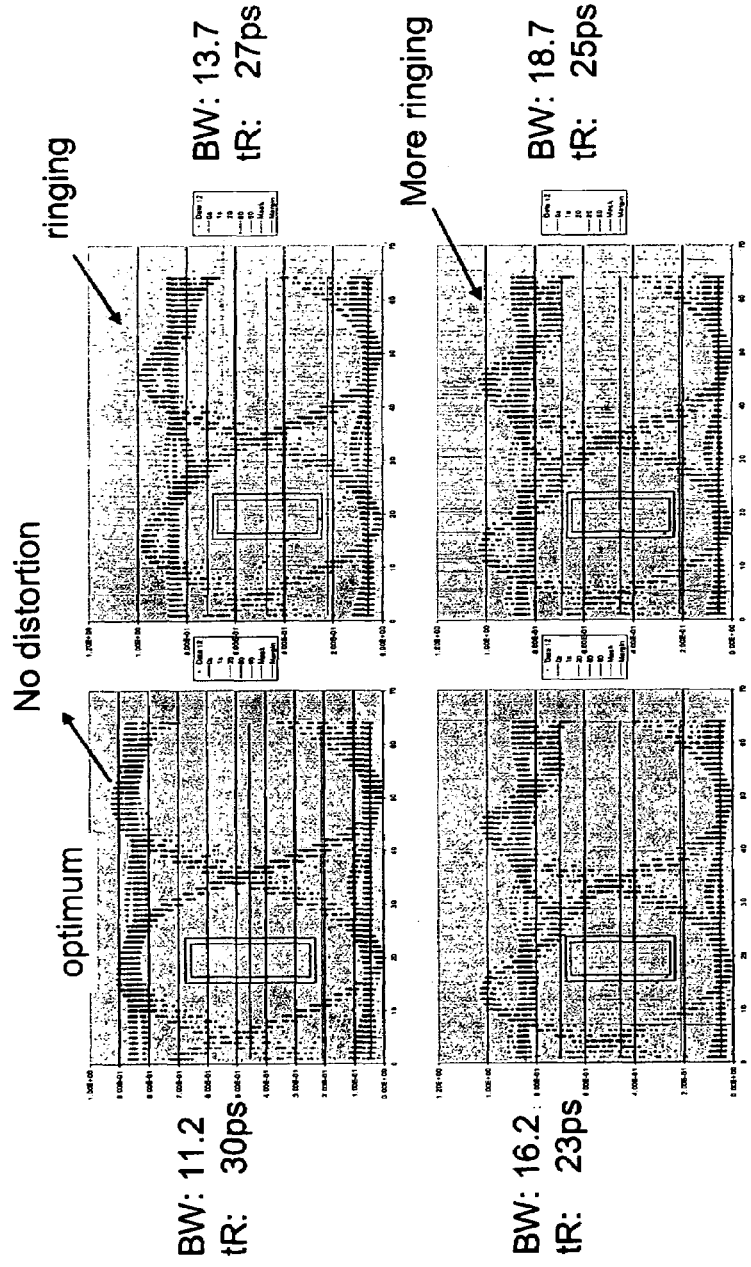
FIG. 10 is a schematic diagram illustrating the effect of the optical spectrum reshaper's BW on the optical eye, wherein the 11.2 GHz BW produces eyes with the least distortion when the bit rate is 10 Gb/s.
Figure 11:
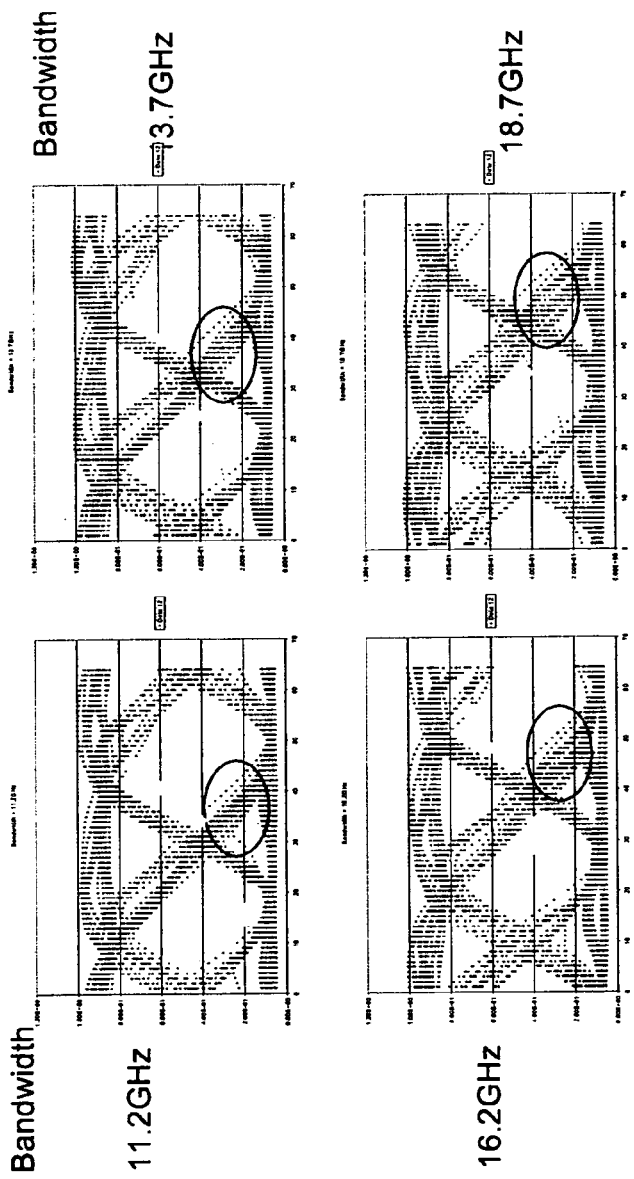
FIG. 11 is a schematic diagram illustrating how distortion can close the eye and increase the dispersion penalty after signal propagation though fiber, the eye being closed by thickening of the falling edge of the eye as bandwidth is increased.

In the example shown in FIG. 10, the optimum BW is 11.2 GHz for a 10 Gb/s signal. The laser in this example has an intrinsic resonant frequency of ~13 GHz. As can be seen from the diagram, the ringing passes through the filter unaffected for bandwidths higher than about 14-15 GHz. This distortion also closes the eye and increases the dispersion penalty after propagation though the fiber. This is illustrated in FIG. 11, where the eye is closed by thickening of the falling edge of the eye as bandwidth is increased (this can be seen by comparing the areas marked by circles in FIG. 11). For lower bandwidths, these frequencies are "cut out", hence opening the eye. It is therefore an embodiment of the present invention that a bandwidth limiting optical spectrum reshaper be used to increase the ER of a directly modulated laser as well as to reduce the distortions and associated transient chirp caused by relaxation oscillation.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A fiber optic communication system, comprising:
   an optical signal source adapted to produce a frequency modulated signal; and
   an optical spectrum reshaper adapted to receive the frequency modulated signal and output a substantially amplitude modulated signal;
   wherein the optical spectrum reshaper limits the bandwidth of the frequency modulated signal; and
   wherein the 3 dB bandwidth of the optical spectrum reshaper is less than 2 times the bit rate of the frequency modulated signal.

2. A fiber optic system according to claim 1 wherein the optical spectrum reshaper is a band pass filter.

3. A fiber optic system according to claim 1 wherein the wavelength of the frequency modulated signal is shifted relative to the peak transmission of the optical spectrum reshaper.

4. A fiber optic system according to claim 1 wherein the bandwidth of the optical spectrum reshaper is adapted to reduce the bit error rate sensitivity of the signal to a desired level after propagation through fiber.

5. A fiber optic system according to claim 1 wherein the bandwidth of the optical discriminator is larger than ½ times and less than 2 times the bit frequency of the modulated signal.

6. A fiber optic system according to claim 1 wherein the optical signal source is a directly modulated laser.

7. A fiber optic system according to claim 6 wherein the bandwidth of the optical spectrum reshaper is adapted to reduce the transient relaxation oscillations in the frequency modulated signal.

8. A fiber optic system according to claim 6 wherein the bandwidth of the optical spectrum reshaper is adapted to reduce the transient chirp in the frequency modulated signal.

* * * * *